(12) United States Patent
Nordmark et al.

(10) Patent No.: US 7,644,256 B2
(45) Date of Patent: Jan. 5, 2010

(54) METHOD IN PIPELINED DATA PROCESSING

(75) Inventors: Gunnar Nordmark, Danderyd (SE); Thomas Boden, Solna (SE)

(73) Assignee: Xelerated AB, Stockholm (SE)

( * ) Notice: Subject to any disclaimer, the term of this patent is extended or adjusted under 35 U.S.C. 154(b) by 283 days.

(21) Appl. No.: 10/542,986

(22) PCT Filed: Jan. 27, 2004

(86) PCT No.: PCT/SE2004/000103
§ 371 (c)(1),
(2), (4) Date: Jul. 21, 2005

(87) PCT Pub. No.: WO2004/068338
PCT Pub. Date: Aug. 12, 2004

(65) Prior Publication Data
US 2006/0155972 A1    Jul. 13, 2006

Related U.S. Application Data

(60) Provisional application No. 60/319,941, filed on Feb. 12, 2003.

(30) Foreign Application Priority Data
Jan. 28, 2003  (SE) .................................. 03000198

(51) Int. Cl.
*G06F 9/00* (2006.01)
(52) U.S. Cl. ...................................... 712/220; 712/228
(58) Field of Classification Search ................. 712/228, 712/220
See application file for complete search history.

(56) References Cited

U.S. PATENT DOCUMENTS 7,080,238 B2 * 7/2006 Van Hoof et al. ........... 712/234

OTHER PUBLICATIONS

Wallace et al.; "Threaded Multiple Path Execution"; 1998; IEEE.*

* cited by examiner

*Primary Examiner*—Alford W Kindred
*Assistant Examiner*—Benjamin P Geib
(74) *Attorney, Agent, or Firm*—Young & Thompson

(57) ABSTRACT

A method in a processor is presented, in which data is processed in a pipelined manner, the data being included in a plurality of contexts, comprising a first (3), in addition to which a plurality of operations is adapted to be executed on the contexts. The method comprises executing an initial operation step (6a) of a first operation on the first context (3), and subsequently commencing an execution of an initial operation step (7a) of a second operation on the first context before an execution on the first context (3) of a following operation step (6b) of the first operation is completed.

7 Claims, 6 Drawing Sheets

| Instruction step | Stage at which instruction step is performed | Stage presented to a programmer as the stage at which the instruction step is performed |
| --- | --- | --- |
| 6a | 2a | 2a |
| 6b | 2b | 2a |
| 6c | 2c | 2a |
| 7a | 2b | 2b |
| 7b | 2c | 2b |
| 7c | 2d | 2b |
| 8a | 2c | 2c |
| 8b | 2d | 2c |
| 8c | 2e | 2c |

Fig. 2

| | | |
|---|---|---|
| 1 | Fetch | 6F |
| 2 | Decode | 6D |
| 3 | If x=0 then goto L | 6E |
| 4 | Fetch | 7F1 |
| 5 | Decode | 7D1 |
| 6 | Store | 6S |
| 7 | Execute | 7E |
| 8 | Store | 7S |
| ⋮ | | |
| L | | |
| L+1 | Fetch | 7F2 |
| L+2 | Decode | 7D2 |
| L+3 | Store | 6S |
| L+4 | Execute | 7E |
| L+5 | Store | 7S |

Fig. 5

METHOD IN PIPELINED DATA PROCESSING

TECHNICAL FIELD

The invention concerns a method in a processor, in which data is processed in a pipelined manner, the data being included in a plurality of contexts, comprising a first context, in addition to which a plurality of operations is adapted to be executed on the contexts.

BACKGROUND

In data processing the rate of the data process is an important factor for an efficient processor. A way to allow a high rate of data passing through a processor is to perform pipelined processing of the data, i.e. allowing the process to be executed on one set of data before the process of previous sets of data are finalized. Such processes are typically carried out in a number of stages at which operations are executed on contexts including sets of data.

SUMMARY OF THE INVENTION

It is an object of the present invention to increase the rate of data being processed in a data processor.

This object is reached by a method of the type mentioned initially, characterized in that the method comprises commencing an execution on the first context of a second operation before a previously commenced execution on the first context of a first operation is completed. This means that in addition to pipelined processing of the data stream, the execution of each operation is pipelined. Thus, a form of "two dimensional" pipelining is achieved. On one hand the data stream is pipelined, and on the other hand, the "operation stream" is pipelined.

The object is also reached with a method of the type described initially, including executing an initial operation step of a first operation on the first context, and subsequently commencing an execution on the first context of an initial operation step of a second operation before an execution on the first context of a following operation step of the first operation is completed. Preferably, each context passes a plurality of consecutive stages, whereby the initial operation step of the first operation is executed on the first context at a first stage, the following operation step of the first operation is executed on the first context at a second stage, and the initial operation step of the second operation is executed on the first context at the second stage.

Thus, the operation pipelining can be done in a number of steps in the pipelined data processor. If each operation is performed in N steps, the processor can run in a higher frequency, i.e. N times higher than in a case with no operation pipelining. This means that during a certain time interval more instructions can be executed. This can provide for a higher data bandwidth throughput in the data stream pipeline.

Preferably, the method comprises receiving at the second stage a result of an execution of the initial operation step of the first operation. This provides for commencing the execution of an operation at one stage, and continuing the execution at a consecutive stage.

Preferably, where the first operation comprises a partial operation of executing an instruction and a partial operation of writing a result of the said instruction execution into a destination in a register, and the second operation comprises the partial operation of fetching an operand, the method can comprise the following steps: Determining if a position in the register, from which the operand is to be fetched in the second operation, is identical with the destination of the partial operation, of the first operation, of writing a result. If the result of the step of determining is negative, fetching the operand from the register. If the result of the step of determining is positive, fetching the result of the said instruction execution. Thereby it is possible to initiate an operation before an operation initiated previously on the same context, without having to wait for the previously initiated operation to be completed. This will facilitate increasing the data processing rate of the processor.

BRIEF DESCRIPTION OF FIGURES

Below, the invention will be described in detail with reference to the drawings, in which FIG. 2 shows a table correlating objects in the process of FIG. 1, and FIG. 5 shows a schematic example of a program code for functions depicted in FIG. 4.

DETAILED DESCRIPTION

Figure 1:
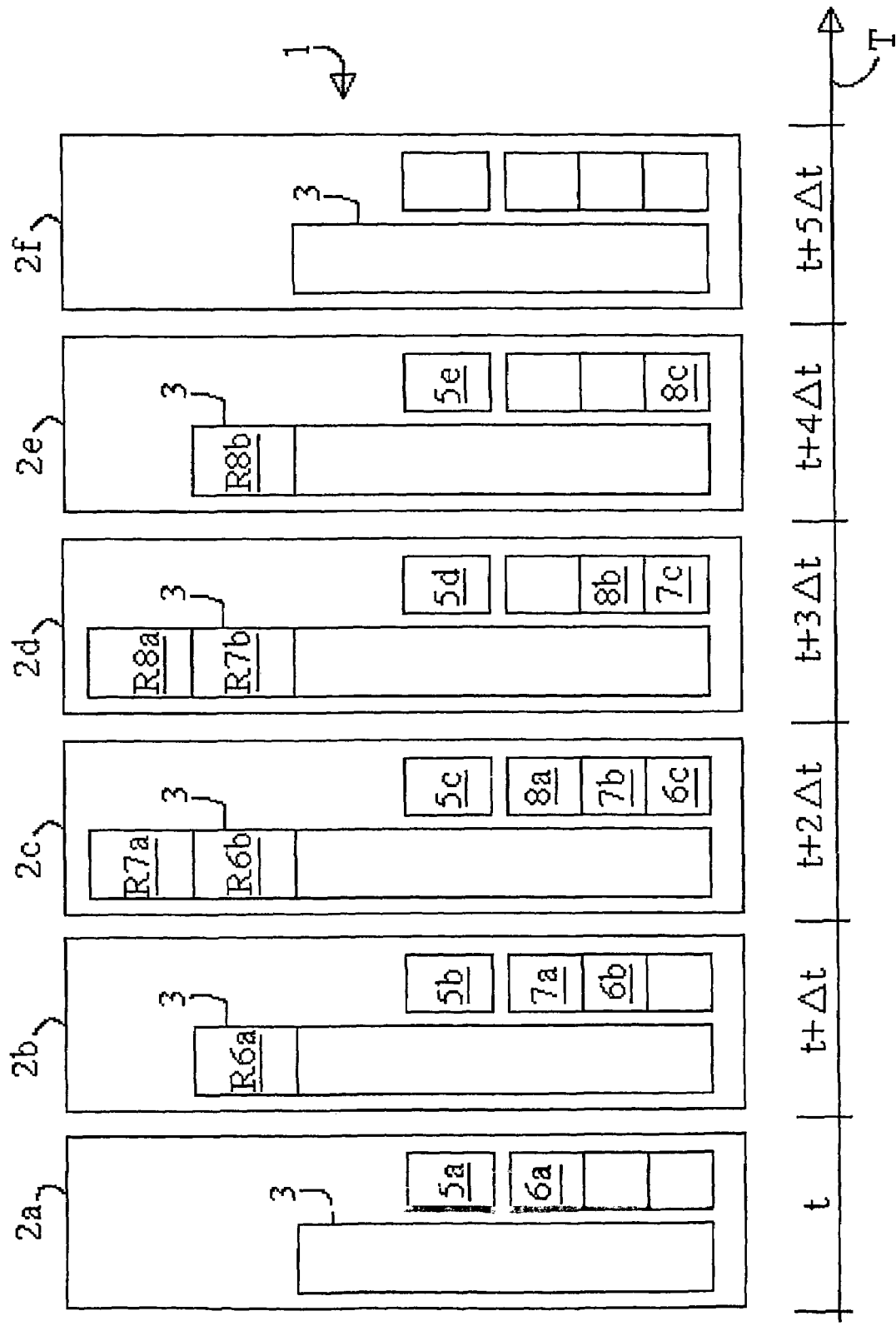
FIGS. 1, 3, 4 and 6 show block diagrams of processes in pipelined data processors.

FIG. 1 depicts schematically a data processing pipeline 1, in a data processor. The pipeline comprises a plurality of stages $2a$-$2f$. For the purpose of this presentation only six stages are shown, whereas any number of stages could be used in the pipeline, and in reality a considerably larger number of stages would be used.

At each clock cycle of the data processor, a context 3, including data to be processed, is received at each stage from the preceding stage, i.e. the stage immediately to the left in FIG. 1. In FIG. 1 each stage $2a$-$2f$ is depicted at a time corresponding to one clock cycle after the preceding stage, which is indicated by the time axis T. Thus, FIG. 1 shows any stage presented at a time occurring after the time of presentation of the preceding stage, the difference in time corresponding to the duration of each clock cycle, $\Delta t$. Hence, the context 3 in any stage in FIG. 1 corresponds to the context in any other stage in FIG. 1. Of course, at the same point in time the stages have different contexts, which is a feature that makes the data processing pipelined.

Each context 3 includes a packet, with data, which may be processed by the processor, a register file, flags, and an instruction counter or instruction pointer, e.g. a row instruction pointer, as described in the international patent applications PCT/SE01/01134 and PCT/SE01/01133, each with the applicant of this application and included herein by reference.

In the data processing pipeline a number of operations are performed in connection to each context. Each operation consists of a number of partial operations. In a plurality of stages $2a$-$2e$, during each clock cycle, partial operations are performed in connection to the context 3. Each operation can comprise executing in a logic unit $5a$-$5e$ in the respective stage an instruction stored in an instruction memory, not shown in FIG. 1. The logic unit could comprise an ALU.

Each operation comprises a number of steps, each comprising one or more of the partial operations. In pipelined data processing, an operation typically comprises the partial operations: (i) instruction fetch, (ii) instruction decoding, (iii) operand fetch, (iv) execution, (v) branch, and (vi) write back. These partial operations could be allocated to any number of operation steps. Suitably, an operation could contain two steps, the first containing partial operations (i) to (iii) and the second containing partial operations (iv) to (vi).

For a better understanding of the concept of the invention, each operation in this example comprises three operation steps, for this presentation referred to as an initial operation step 6a, 7a, 8a, an intermediate operation step 6b, 7b, 8b, and a final operation step 6c, 7c, 8c. The intermediate and the final operations step are also referred to as "following operation step".

In general, each operation can comprise any number of operation steps. It should also be kept in mind that the context can alternatively be received by a stage of the processing pipeline without any partial operations being performed on it, or on parts of it.

A first context 3; which could be any context in the processor, is received at a first stage 2a, which could be any stage in the processor. In the first stage 2a, a first initial operation step 6a of a first operation is performed on the first context 3. A first initial operation step result R6a is generated as a result of the first initial operation step 6a being performed on the first context 3.

Subsequently, in a second stage 2b, the first context 3, modified by the first initial operation step 6a, is received from the first stage 2a. The modified first context 3 comprises the first initial operation step result R6a. It should be noted that the pipeline is adapted so that when a context is received in a stage from a previous stage, the previous stage receives another context, as described in the above referenced international patent application PCT/SE01/01134.

In a pipelined manner, essentially simultaneously with the first context 3 being received in the second stage 2b, a second context, not shown, is received at the first stage 2a.

In the second stage 2b, a first intermediate operation step 6b of the first operation is performed on the first context 3, based on the first initial operation step result R6a. As a result a first intermediate operation step result R6b is generated.

During the same clock cycle, at t+Δt, the initial operation step 6a of the first operation is executed on the second context. Thus, the initial operation step 6a of the first operation is executed on the second context before the execution on the first context 3 of the following operation step 6b of the first operation is completed. In other words, an execution on the second context of a first operation is commenced before a previously commenced execution on the first context of the first operation is completed.

Also, in the second stage 2b, a second initial operation step 7a of a second operation is performed on the first context 3, and a second initial operation step result R7a is generated as a result thereof.

Subsequently, in a third stage 2c, the modified first context 3 is received from the second stage 2b. Thereby, the first context 3 comprises the second initial operation step result R7a and the first intermediate operation step result R6b.

In the third stage 2c, a first final operation step 6c of the first operation is performed on the first context 3, based on the first intermediate operation step result R6b. Since, in this example, each operation consists of three operation steps, by the first final operation step 6c, the partial operations of the first operation on the first context 3 are completed.

Also, in the third stage 2c, a second intermediate operation step 7b of the second operation is performed on the first context 3, based on the second initial operation step result R7a. A second intermediate operation step result R7b is generated as a result thereof.

Also, in the third stage 2c, a third initial operation step 8a of a third operation is performed on the first context 3, and a third initial operation step result R8a is generated as a result thereof.

FIG. 2 shows a table in which the first two columns correlate operation steps and stages in the example in FIG. 1. It can easily be understood that, since different steps of each operation are carried out in separate stages of the processor pipeline, a person programming the instruction memory will be faced with a task that can seem complicated in cases where there are a lot of stages in the pipeline. Therefore, the processor is arranged so that all steps, 6a-6c, 7a-7c, etc, of each operation are presented to a programmer as being carried out in the same stage, 2a, 2b, etc, of the pipeline, see the third column in the table in FIG. 2. This will facilitate the job of the programmer since it keeps the programming of the instruction memory clear and well-arranged. Thus, the true correlation of operation steps and stages of the processing pipeline will not be visible to the programmer.

Referring again to FIG. 1, in this example, the third stage is the last stage at which an operation is initiated. A fourth, fifth and sixth stage 2d, 2e, 2f are located at the end of the pipeline. Since all steps of the second and third operation appears to a programmer of the processor to be executed in the second and third stage 2b, 2c, respectively, the stages following the third stage 2c will be invisible to the programmer.

In the fourth stage 2d, the modified first context 3 is received from the third stage 2c, whereby it comprises the third initial operation step result R8a and the second intermediate operation step result R7b. A second final operation step 7c is performed, based on the second intermediate operation step result R7b. Thereby, the partial operations of the second operation are completed. A third intermediate operation step 8b is performed, based on the third initial operation step result R8a, resulting in a third intermediate operation step result R8b.

Subsequently, in the fifth stage 2e, the modified first context 3 is received from the fourth stage 2d, whereby it comprises the third intermediate operation step result R8b, based on which a third final operation step 8c is performed. Thereby, the partial operations of the third operation are completed. In the sixth stage 2f the context 3 is received after completion of partial operations of three operations.

Usually, in a data processing pipeline the execution of an operation is dependent upon the result of a previous execution of another operation. According to a preferred embodiment of the invention, multiple branch executions of operations or operation steps are performed to facilitate commencing execution of subsequent operations before previously initiated operations have been completed.

Figure 3:
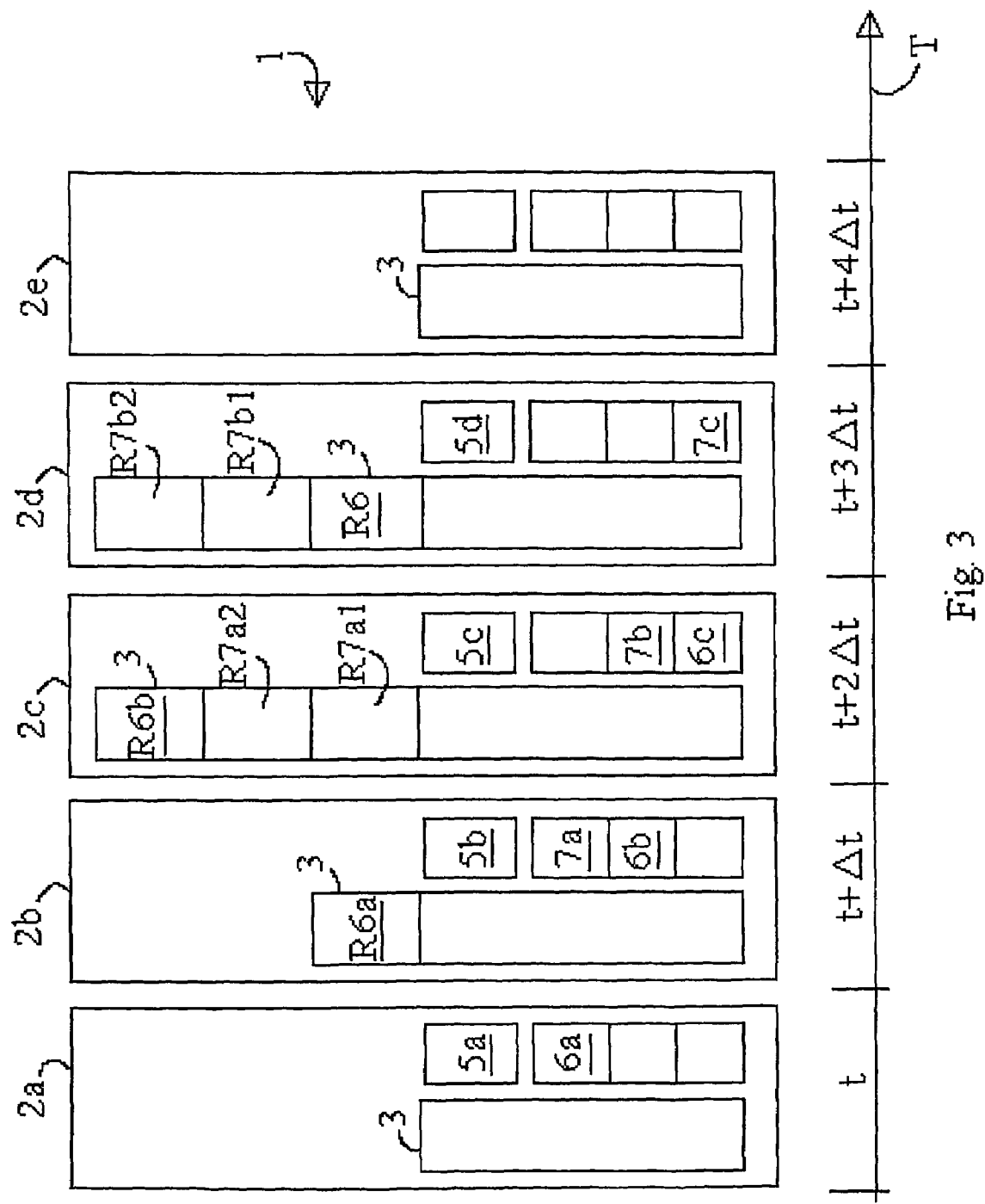

For an example of multiple branch execution, FIG. 3 depicts schematically a data processing pipeline 1, similar to the pipeline in FIG. 1. For this presentation the pipeline comprises only five stages 2a-2e.

As in the example presented with reference to FIG. 1, partial operations including the execution of instructions stored in an instruction memory, not shown in FIG. 3, are performed on a context 3 by logic units 5a-5d in the stages. As in the example above, each operation comprises three operation steps: an initial operation step 6a, 7a, an intermediate operation step 6b, 7b, and a final operation step 6c, 7c. In this example, only two operations are executed.

A first context 3 is received at a first stage 2a, where a first initial operation step 6a of a first operation is performed. A first initial operation step result R6a is generated as a result of the first initial operation step 6a being performed on the first context 3.

Subsequently, in a second stage 2b, the first context 3, comprising the first initial operation step result R6a, is received from the first stage 2a. In the second stage 2b, a first intermediate operation step 6b of the first operation is performed on the first context 3, based on the first initial operation step result R6a. As a result a first intermediate operation step result R6b is generated.

In this example, the execution of a second operation is dependent upon the final result of the first operation. We assume that there are two execution paths of the second operation, both of which are initiated in a second initial operation step 7a of the second operation. Since the second initial operation step 7a is carried out in stage 2b, before a first final operation step of the first operation has been executed, both execution paths of the second initial operation step 7a are carried out, resulting in two alternative second initial operation step results, R7a1, R7a2.

In a real utilization of the invention more than two execution paths are possible in an operation, whereby all paths may have to be executed or at least initiated before a subsequent operation is initiated.

Subsequently, in a third stage 2c, the modified first context 3 is received from the second stage 2b. Thereby, the first context 3 comprises the two alternative second initial operation step results, R7a1, R7a2, and the first intermediate operation step result R6b.

In the third stage 2c, a first final operation step 6c of the first operation is performed on the first context 3, based on the first intermediate operation step result R6b, whereby the partial operations of the first operation on the first context 3 are completed. Thereby, a first operation result, R6, is generated.

Also, in the third stage 2c, two second intermediate operation steps 7b of the second operation are performed on the first context 3, each based on one of the two alternative second initial operation step results, R7a1, R7a2. One second intermediate operation step result, R7b1, is generated as a result of the second intermediate operation steps 7b being performed on the basis of one of the two alternative second initial operation step results, R7a1. Another second intermediate operation step result, R7b2, is generated as a result of the second intermediate operation steps 7b being performed on the basis of the other of the two alternative second initial operation step results, R7a2.

In a fourth stage 2d, the modified first context 3 is received from the third stage 2c, whereby it comprises the first operation result, R6, and both second intermediate operation step results R7b1, R7b2. Based on the first operation result, R6, it is determined whether a second final operation step 7c should be carried out based on one or the other of the second intermediate operation step results R7b1, R7b2. When this is determined, the second final operation step 7c is performed, based on whichever of the two second intermediate operation step results R7b1, R7b2, that was determined to form a base of the second final operation step 7c. Thereby, the partial operations of the second operation are completed.

A number of alternatives of multiple branch execution are possible. For example, different numbers of execution paths could be performed at different steps of the same operation. Referring to the example in FIG. 3, a plurality of execution paths could be performed based on each initial operation step result R7a1, R7a2, in the intermediate operation step 7b, resulting in more than two intermediate operation step results.

Alternatively, only one execution path could be performed in the initial operation step 7a, upon which two or more execution paths of the following, or intermediate, operation step 7b are performed.

In general, according to a preferred embodiment of the invention, where at least one of the operation steps of an operation comprises at least two alternative execution paths, at least two of the alternative execution paths of the operation step can be executed at a stage of the processing pipeline. Thereby, results are obtained of at least two of the executions of the alternative execution paths. Based on a result of an execution of another operation initiated before the initiation of the said operation, it is determined which one of the results of the executions of the alternative execution paths, an execution of an operation step, following said operation step comprising at least two alternative execution paths, is to be based on.

Multiple branch execution, as described above allows for the execution of an operation to commence, in spite of this execution being dependent on the result of a previously commenced execution of another operation, and the latter execution not being finalized.

Figure 4:
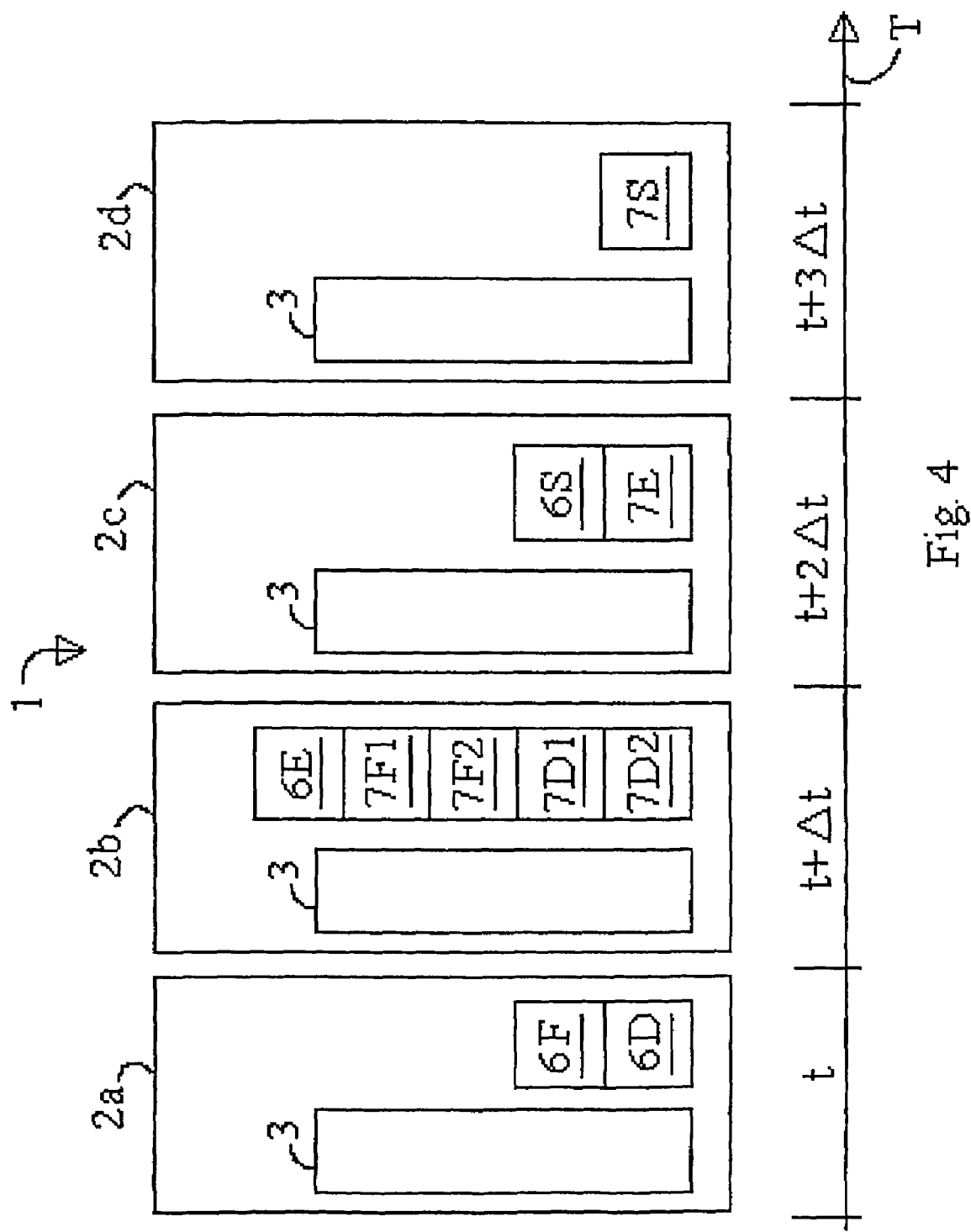

For a further example of multiple branch execution we refer to FIGS. 4 and 5. For simplicity the example contains a data processing pipeline with only four stages as depicted in FIG. 4. FIG. 5 shows a program code for the pipeline depicted in FIG. 4.

In a first stage 2a a context 3 is received. In this stage 2a two partial operations of a first operation are performed regarding the context 3. One of these partial operations is a fetch partial operation 6F, including fetching an instruction in an instruction memory, (not shown). The other partial operation is a decode partial operation 6D, including decoding of the fetched operation. In FIG. 5 these partial operations are executed according to rows 1 and 2.

In a second stage 2b, an execute partial operation 6E of the first operation is performed on data related to the context 3 according to the instruction fetched and decoded in the first stage 2a. Also, in the second stage 2b a second operation is commenced regarding the context 3.

The instruction executed in the execute partial operation 6E is a conditional jump, the jump depending on a value of a parameter x. In FIG. 5 it can be seen on row 3 that if x=0, the program is continued on row L. However, the result of the execute partial operation 6E will not be known until the end of the clock cycle t+Δt, (see FIG. 4), during which the context is in the second stage 2b. Therefore, referring to FIG. 5, when the second operation is commenced it will not be known if the program will be on row L+1 or row 4, since it will not be known whether the execution of the instruction regarding the previously commenced operation will cause the program to jump or not. Therefore, a multiple branch execution of the second operation is performed, involving two fetch partial operations 7F1, 7F2 of the second operation. Referring to FIG. 5, one of these fetch partial operations is performed according to row 4 and the other is performed according to row L+1 in the program. Similarly, two decode partial operations 7D1, 7D2 are performed, one according to row 5 and the other according to row L+2 in the program. In a third stage 2c of the data processing pipeline, the context 3 is received and a store partial operation 6S of the first operation is performed, which, depending on whether or not a jump was performed in the preceding stage 2b, is performed according to row 6 or row L+3 in the program, (see FIG. 5).

Since the result of the execute partial operation 6E is known, it can be determined which one of the instructions fetched and decoded in the second stage 2b should be executed in the third stage 2c. If no jump was made as a result of the execute partial operation 6E in the second stage 2b, the instruction fetched and decoded according to program rows 4 and 5 will be used in an execute partial operation 7E in the third stage 2c according to row 7 in the program. If a jump was made as a result of the execute partial operation 6E in the second stage 2b, an execute partial operation 7E will be performed using the instruction fetched and decoded in the second stage 2b according to program rows L+1 and L+2, (see FIG. 5).

The multiple branch execution will require some additional hardware in the processor, since one or more partial operation is executed according to more than one part of the program simultaneously. However, in traditional methods the need to include in the program no operation commands results in a lower performance of the processor. With multiple branch execution no operation commands can be avoided and a high performance can be obtained.

Alternatively, or in combination with multiple branch execution, a procedure, herein referred to as operand forwarding, can be used. To illustrate this procedure we refer to FIG. 6, in which a data processing pipeline with operation pipelining is illustrated.

Figure 6:
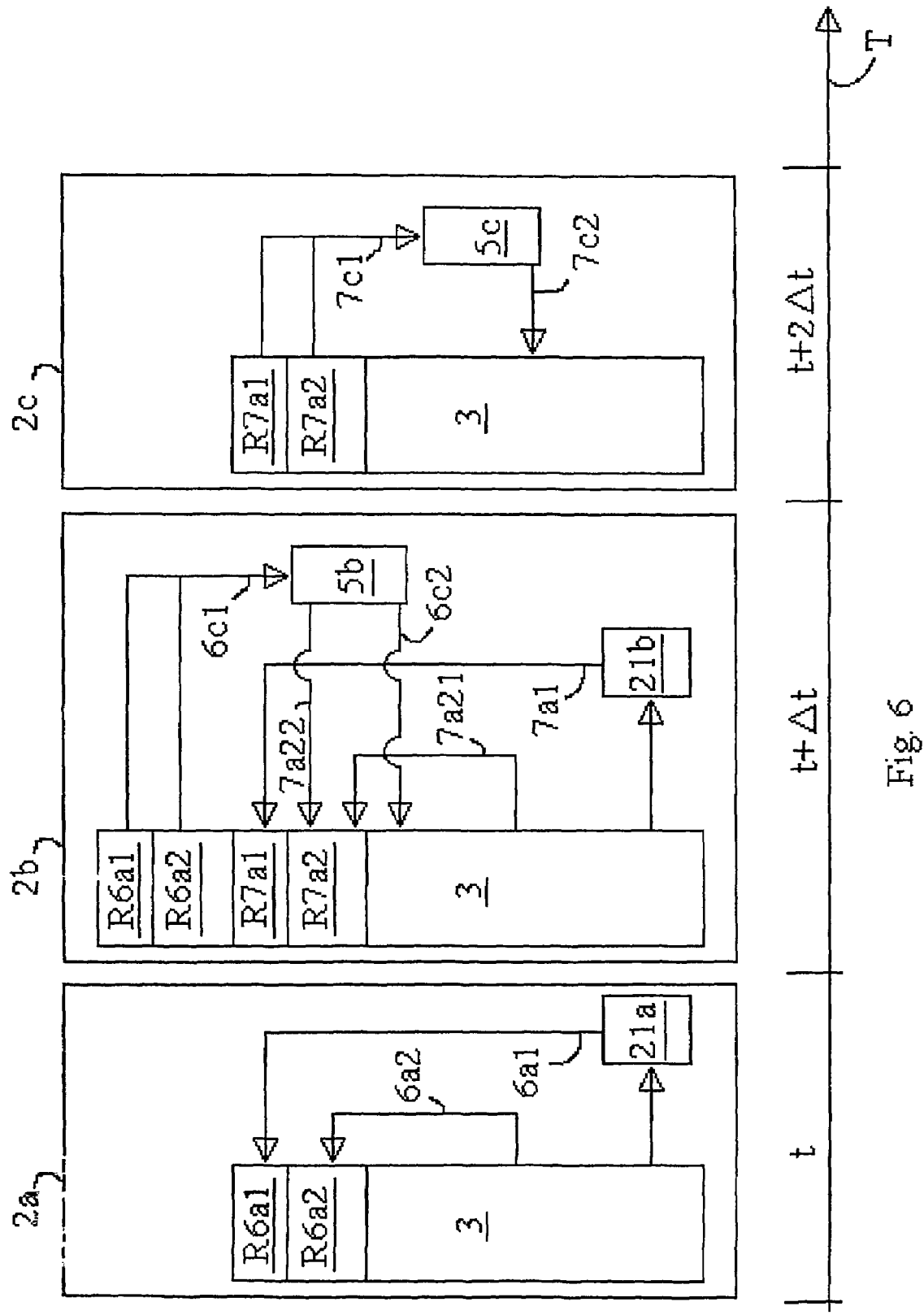

In the pipeline in FIG. 6 operations containing two steps each are performed on a context 3. For the sake of clarity of this presentation, the pipeline contains only three stages 2a, 2b, 2c, of which a final stage is not visible to a programmer of the pipeline, as explained above with reference to FIG. 1.

In a first stage 2a an initial step of a first operation is executed in a clock cycle at a time t. The initial step includes a first instruction fetch partial operation 6a1, which is a partial operation of fetching an instruction from an instruction memory 21a, and a first operand fetch partial operation 6a2, which is a partial operation of fetching at least one operand from the context 3. In this example, the operation also contains an instruction decoding partial operation, i.e. a partial operation, not depicted in FIG. 6, of decoding the instruction from the instruction memory. The partial operations of the initial step of the first operation result in first initial step results, i.e. an instruction R6a1 and operand R6a2.

In a subsequent clock cycle at a time t+Δt, in a second stage 2b a final step of the first operation is executed. The final step includes a first execute partial operation 6c1, which is a partial operation of executing the instruction R6a1 on the operands R6a2 in a logic unit 5b, and a first write back partial operation 6c2, which is a partial operation of writing back to the context 3 a result of the execution in the logic unit 5b. (Each context can also contain a branch partial operation, which is a partial operation, not depicted in FIG. 6, for upgrading a pointer in the context, which pointer is used for fetching an instruction.)

In the same clock cycle at a time t+Δt, in the second stage, an initial step of a second operation is also executed. This step includes a second instruction fetch partial operation 7a1. The initial step of the second operation also includes a second operand fetch partial operation. According to the procedure of operand forwarding, it is determined whether a position in a register in the context, from which an operand is to be fetched in the second operand fetch partial operation, is identical with a destination of the first write back partial operation 6c2. If any register position, from which an operand is to be fetched in the second operand fetch partial operation, is not identical with the destination of the first write back partial operation 6c2, the second operand fetch partial operation includes fetching 7a21 the operands from the context 3. However, if any register position, from which an operand is to be fetched in the second operand fetch partial operation, is identical with the destination of the first write back partial operation 6c2, the second operand fetch partial operation includes fetching 7a22 the object of the first write back partial operation 82a. This means fetching the result of the execution 6c1 of the instruction R6a1 on the operands R6a2 in the logic unit 5b. Thus, the result of the execution of the instruction is "stolen" before the first operation is completed.

In short, where an instruction is to use a result of a preceding instruction, and fetches a value in a register to which the preceding instruction will enter a new value, an incorrect value will be obtained. Instead the result is fetched from another location, e.g. a temporary register or an ALU-result, i.e. directly in connection to an execution in the preceding instruction.

Referring to FIG. 6, in the second stage 2b, the partial operations of the initial step of the second operation result in second initial step results, i.e. an instruction R7a1 and operand R7a2. In a third stage 2c, in a subsequent clock cycle at a time t+2Δt, a final step of the second operation is executed. The final step includes a second execute partial operation 7c1 and a second write back partial operation 7c2.

The invention claimed is:

1. A method in a processor, in which data is processed in a pipelined manner, the data being included in a plurality of contexts, comprising a first context (3), each context passing a plurality of consecutive stages (2a-2f), in addition to which a plurality of operations is adapted to be executed on the contexts, each operation comprising a plurality of consecutive operation steps and the consecutive operation steps of one operation being executed on a context at least two different consecutive stages (2a-2f), the method comprising:
   at a first stage (2a), executing an initial operation step (6a) of a first operation on the first context (3), and
   at a second stage (2b) that consecutively follows the first stage (2a), subsequently commencing an execution on the first context of an initial operation step (7a) of a second operation before an execution on the first context (3) of a following operation step (6b) of the first operation is completed, wherein,
   at each clock cycle of the processor, the first context (3) is received at one of the stages from the preceding stage, the first context is unconditionally moved to a next stage and a subsequent context of a subsequent operation is received at the first stage (2a).

2. A method according to claim 1, comprising commencing at the first stage (2a) an execution of the initial operation step (6a) of the first operation on a second context before the execution on the first context (3) of the following operation step (6b) of the first operation is completed.

3. A method according to claim 1, comprising receiving at the second stage a result (R6a) of an execution of the initial operation step (6a) of the first operation.

4. A method according to claim 1, whereby at least one of the operation steps of the second operation comprises at least two alternative execution paths, and at least two of the alternative execution paths of the operation step are executed.

5. A method according to claim 4, further comprising:
   obtaining results (R7b1, R7b2) of at least two of the executions of the alternative execution paths, and
   determining, based on a result (R6) of an execution of an operation step of an operation initiated before the initiation of the second operation, which one of the results (R7b1, R7b2), of the executions of the alternative execution paths, an execution of an operation step of the second operation, following said operation step comprising at least two alternative execution paths, is to be based on.

6. A method according to claim 1, whereby the processor is arranged so that the following operation step (6b) of the first operation is presented to a programmer as being executed at the first stage (2a).

7. A method according to claim 1, wherein the first operation comprises a partial operation of executing (6c1) an instruction and a partial operation of writing (6c2) a result of the said instruction execution into a destination in a register, and the second operation comprises the partial operation of fetching (7a2 1, 7a22) an operand, the method comprising (a) determining if a position in the register, from which the operand is to be fetched (7a2 1, 7a22) in the second operation, is identical with the destination of the partial operation, of the first operation, of writing (6c2) a result, (b) if the result of the determination in step (a) is negative, fetching (7a21) the operand from the register, and (c) if the result of the determination in step (a) is positive, fetching (7a22) the result of the said instruction execution.

* * * * *